US011334663B2

(12) United States Patent
Eells et al.

(10) Patent No.: US 11,334,663 B2
(45) Date of Patent: May 17, 2022

(54) DETERMINING WHETHER TWO PROGRAMS ARE IDENTICAL

(71) Applicant: INTERNATIONAL BUSINESS MACHINES CORPORATION, Armonk, NY (US)

(72) Inventors: John R. Eells, Pleasant Valley, NY (US); Mark A. Nelson, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 15/653,699

(22) Filed: Jul. 19, 2017

(65) Prior Publication Data

US 2019/0026208 A1 Jan. 24, 2019

(51) Int. Cl.
*G06F 21/52* (2013.01)
*G06F 11/30* (2006.01)
*G06F 21/56* (2013.01)
*G06F 16/2455* (2019.01)
*G06F 16/903* (2019.01)

(52) U.S. Cl.
CPC .......... *G06F 21/52* (2013.01); *G06F 11/3072* (2013.01); *G06F 21/566* (2013.01); *G06F 16/24556* (2019.01); *G06F 16/90344* (2019.01)

(58) Field of Classification Search
CPC .......... G06F 21/52–53; G06F 11/3072; G06F 17/30489; G06F 17/30985

USPC ....................................................... 717/127
See application file for complete search history.

(56) References Cited

U.S. PATENT DOCUMENTS

| 6,279,079 B1 * | 8/2001 | Sakamoto | G06F 12/0875 711/133 |
| 7,647,639 B2 | 1/2010 | Taylor | |
| 8,364,973 B2 * | 1/2013 | Khosravi | G06F 21/64 713/187 |
| 2006/0265761 A1 * | 11/2006 | Rochette | G06F 21/53 726/27 |
| 2007/0016629 A1 * | 1/2007 | Reinsch | G06F 16/51 |
| 2007/0220500 A1 * | 9/2007 | Saunier | G06F 21/51 717/162 |

(Continued)

OTHER PUBLICATIONS

Garfinkel et al., "Terra: A Virtual Machine-Based Platform for Trusted Computing", ACM, 2003, 14pg. (Year: 2003).*

(Continued)

*Primary Examiner* — Ryan D. Coyer
(74) *Attorney, Agent, or Firm* — Cantor Colburn LLP; Edward Wixted

(57) ABSTRACT

Embodiments are directed to a computer-implemented method for determining whether a program has been modified. The method can include determining that a first instance of the program is loaded in main memory. The method can further include determining a starting memory location of the first instance of the program. A second instance of the program is loaded into main memory. The (Continued)

second instance of the program is loaded such that memory references in the second instance of the program are resolved as if the second instance were loaded at the starting memory location of the first instance of the program. The first instance of the program is compared with the second instance of the program.

11 Claims, 4 Drawing Sheets

(56) References Cited

U.S. PATENT DOCUMENTS

| | | | |
|---|---|---|---|
| 2009/0172814 A1* | 7/2009 | Khosravi | G06F 21/51 726/23 |
| 2013/0007883 A1* | 1/2013 | Zaitsev | G06F 21/567 726/24 |
| 2013/0031067 A1* | 1/2013 | Iyer | G06F 11/302 707/703 |
| 2013/0117849 A1* | 5/2013 | Golshan | G06F 21/53 726/23 |
| 2014/0007103 A1* | 1/2014 | Nachum | G06F 9/46 718/100 |
| 2014/0082327 A1* | 3/2014 | Ghose | G06F 9/3877 712/205 |
| 2016/0246960 A1 | 8/2016 | Chauvet et al. | |
| 2016/0357958 A1* | 12/2016 | Guidry | G06F 21/53 |

OTHER PUBLICATIONS

Zaremski et al., "Specification Matching of Software Components", ACM, 1997, 37pg. (Year: 1997).*
Apiwattanapong, et al., "A Differencing Algorithm for Object-Oriented Programs", ACM, 2007, 12pg. (Year: 2007).*
Buse et al., "Automatically Documenting Program Changes", ACM, 2007, 10pg. (Year: 2007).*
Kim et al., "Java-MaC: A Run-Time Assurance Approach for Java Programs", Kluwer, 2004, 27pg. (Year: 2004).*
Eells et al., "Determining Whether Two Programs Are Identical," U.S. Appl. No. 15/805,675, filed Nov. 7, 2017.
List of IBM Patents or Patent Applications Treated as Related; Date Filed: Jul. 19, 2017, 2 pages.
IBM Knowledge Center "Steps for verifying a signed program", z/OS Security Server RACF Security Administrator's Guide, downloaded Mar. 17, 2017; retrieved at: https://www.ibm.com/support/knowledgecenter/SSLTBW_2.1.0/com.ibm.zos.v2r1.icha700/svpvers.htm; 3 pgs.
Wikipedia "Open Source Tripwire"; retrieved at: https://en.wikipedia.org/wiki/Open_Source_Tripwire; dated Mar. 17, 2017; 1 pg.

* cited by examiner

DETERMINING WHETHER TWO PROGRAMS ARE IDENTICAL

BACKGROUND

The present invention generally relates to computer programs and methodology. More specifically, the present invention relates to determining whether two programs are identical.

On a general purpose computer, an operating system is system software that manages computer hardware and software resources and provides common services for computer programs. The operating system loads an application, consisting of one or more programs, into memory and allows the application to run, giving the application access to various components of the system that the application needs to run. It is sometimes desirable to determine if a program or application that is currently loaded in random access memory (RAM) has been modified. This can be desirable for programs that are part of the operating system and application programs.

SUMMARY

Embodiments of the present invention are directed to a computer-implemented method for determining whether a program has been modified. A non-limiting example of the method can include determining that a first instance of the program is loaded in main memory. The method can further include determining a starting memory location of the first instance of the program. A second instance of the program is loaded into main memory. The second instance of the program is loaded such that memory references in the second instance of the program are resolved as if the second instance were loaded at the starting memory location of the first instance of the program. The first instance of the program is compared with the second instance of the program.

Embodiments of the invention are directed to a computer system for determining whether a program has been modified. The computer system can include a memory and a processor system. The processor system is configured to: determine that a first instance of the program is loaded in main memory. The processor is further configured to determine a starting memory location of the first instance of the program. A second instance of the program is loaded such that memory references in the second instance of the program are resolved as if the second instance were loaded at the starting memory location of the first instance of the program. The first instance of the program is compared with the second instance of the program.

Embodiments of the invention are directed to a computer program product system for determining whether a program has been modified. The computer system can include a memory and a processor system. The processor system is configured to: determine that a first instance of the program is loaded in main memory. The processor is further configured to determine a starting memory location of the first instance of the program. A second instance of the program is loaded such that memory references in the second instance of the program are resolved as if the second instance were loaded at the starting memory location of the first instance of the program. The first instance of the program is compared with the second instance of the program.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
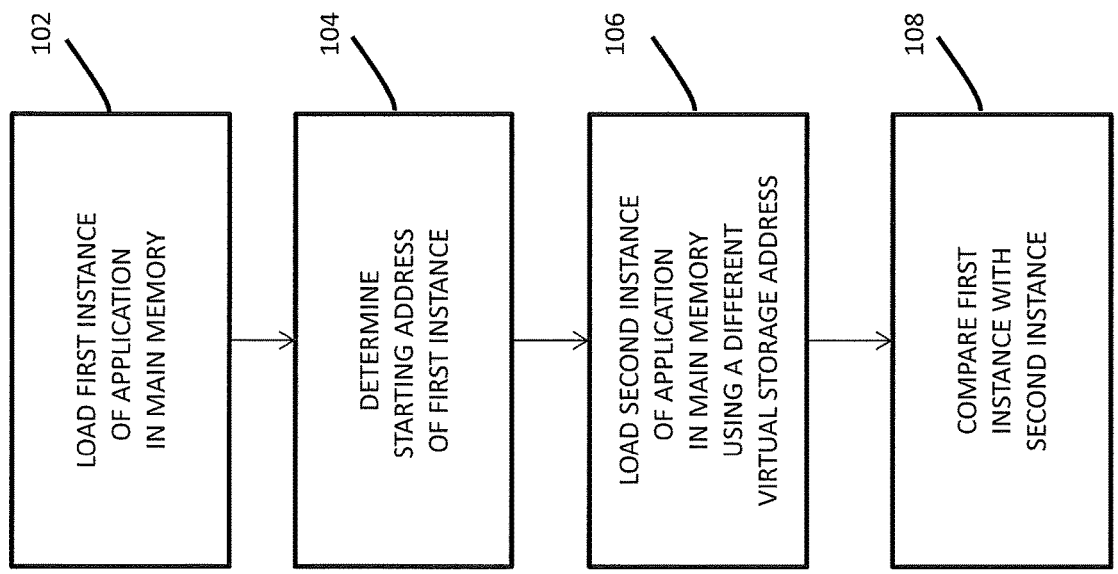
FIG. 1 depicts a flow chart illustrating the operation of one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

There are a variety of reasons that one might want to compare two versions of operating system programs or applications that execute on operating system programs. For example, one might want to determine if a version of a program has been infected with malware, such as a virus, Trojan horse, and the like. A program might have been recently updated and one might want to determine if an instance of a program is the latest version of the program or is a previous version. In addition, one might want to determine if programs that make up an operating system have been changed, to ensure the integrity and recoverability of the operating system. This can be important because a failure of such a critical part of the system that, if the operating system becomes corrupted, the system can fail.

If one were comparing two versions of a program or an application that are both located in secondary memory, such a comparison would be relatively simple because all that would need to be performed is to determine if every bit is identical. However, if one of the versions has already been loaded into main memory, an issue can occur: references to memory locations can change depending on where the program was loaded.

To take a simplified example, a program can have "relocatable" constants. In other words, a certain value, instead of being stored or retrieved from a specific absolute memory address, is stored in a relative memory address. For example, the program has constants stored at 0x0010 bytes and 0x0040 bytes from the beginning of the program. Thus, a first instance of the program is stored beginning at memory location 0x1000, then the two constants in question will be stored at 0x1010 and 0x1040.

A second instance of the same program might be loaded beginning at memory location 0x2000. Thus, the two constants in question are stored at locations 0x2010 and 0x2040. If one compares the first instance of the program to the second instance of the program, they will not be identical because a reference to memory location 0x1010 in the first instance will be a reference to memory location 0x2010 in the second instance.

Turning now to an overview of the aspects of the invention, one or more embodiments of the invention address the above-described shortcomings of the prior art by providing a method for comparing two programs to determine if the programs are identical. An operating system can have a program called a "Contents Supervisor" that includes a parameter that indicates a virtual storage address. The Contents Supervisor will load the program at a certain address for execution. But the Contents Supervisor performs the relocation as if the program were actually located at the specified virtual storage address. Thus, each instance of a program can be loaded by the Contents Supervisor as if they were loaded at the same memory location, enabling binary comparisons without having to worry about changed memory locations.

The above-described aspects of the invention address the shortcomings of the prior art by allowing a comparison of the two instances of a program that have identical locations for the relocatable constants, enabling a fair comparison of two instances of programs, no matter where the programs were actually loaded.

Figure 3:
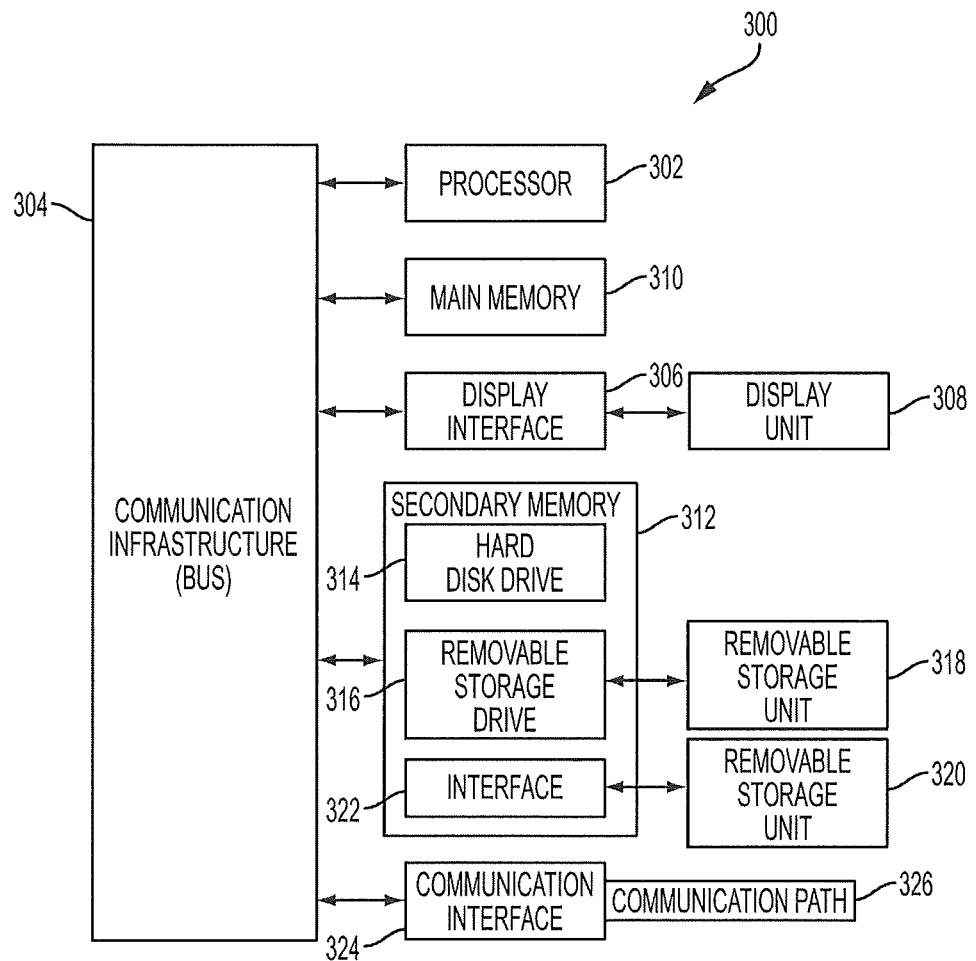
FIG. 3 depicts a computer system capable of performing one or more embodiments.

Turning now to a more detailed description of aspects of the present invention, FIG. 1 depicts a flowchart illustrating a method 100 according to embodiments of the invention. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by system 300 (FIG. 3).

Method 100 can be executed by a program known as a "Contents Supervisor". A first instance of a program is loaded into main memory (block 102). A user wishes to compare the already running first instance of the program is identical to a second instance of the program that is located in secondary memory. In some embodiments, the entirety of the first instance of the program is loaded in main memory. In some embodiments, only a portion of the first instance of the program is loaded in main memory. The memory location at which the first instance was loaded is determined (block 104). This can be done in one of a variety of different manners, now known or developed in the future. In some embodiments, whenever a program is loaded, the memory location at which the program is loaded is stored. A second instance of the program is loaded into main memory from secondary memory (block 106). This second instance is loaded at a specified virtual storage address—a different, non-overlapping address than the first instance was loaded. However, the second instance is treated as if it were loaded at the same address as the first instance. Memory references (e.g., conditional jumps, relocatable constants, and the like) in the second instance are resolved as if the second instance were loaded at the same address as the first instance. Because the second instance is treated as if it were loaded at the same address as the first instance, the contents of any memory locations will be identical in the first and second instance unless the first instance has been changed after being loaded. A comparison can then be made between the first instance and second instance, to see if the first instance and second instance are identical (block 108). The second instance that is loaded is identical to the first instance when the first instance was first loaded. Thus, if there are any differences, it would be because the first instance somehow was modified after it was first loaded. It should be noted that because the memory locations in the second instance point to locations that are within the first instance, the second instance might not operate correctly if it were executed (e.g., conditional jumps might resolve in a memory location where the first instance is loaded. However, that fact should not matter because the second instance is only used for comparison purposes.

In some use cases, the second instance is a known good copy of the program. A known good copy means that the program is the latest version of the program and has not been modified without permission. Thus, by comparing the first instance of the program to the second instance, one is comparing the first instance to a known good copy.

It should be understood that while the terms "application" and "program" may be used in various descriptions, any one of a variety of software programs can be analyzed using embodiments of the invention. This includes programs that make up the operating system as well as applications that execute on an operating system and any other type of software. Because a failure of the operating system software can be so catastrophic, it can be desirable to execute method 100 in a periodic manner to detect unauthorized, undesirable updates to the operating system. These updates can be intended (for example a hack into one or more software programs) or due to programming errors in these or other software programs that cause the inadvertent overwriting of portions of the software.

Figure 2:
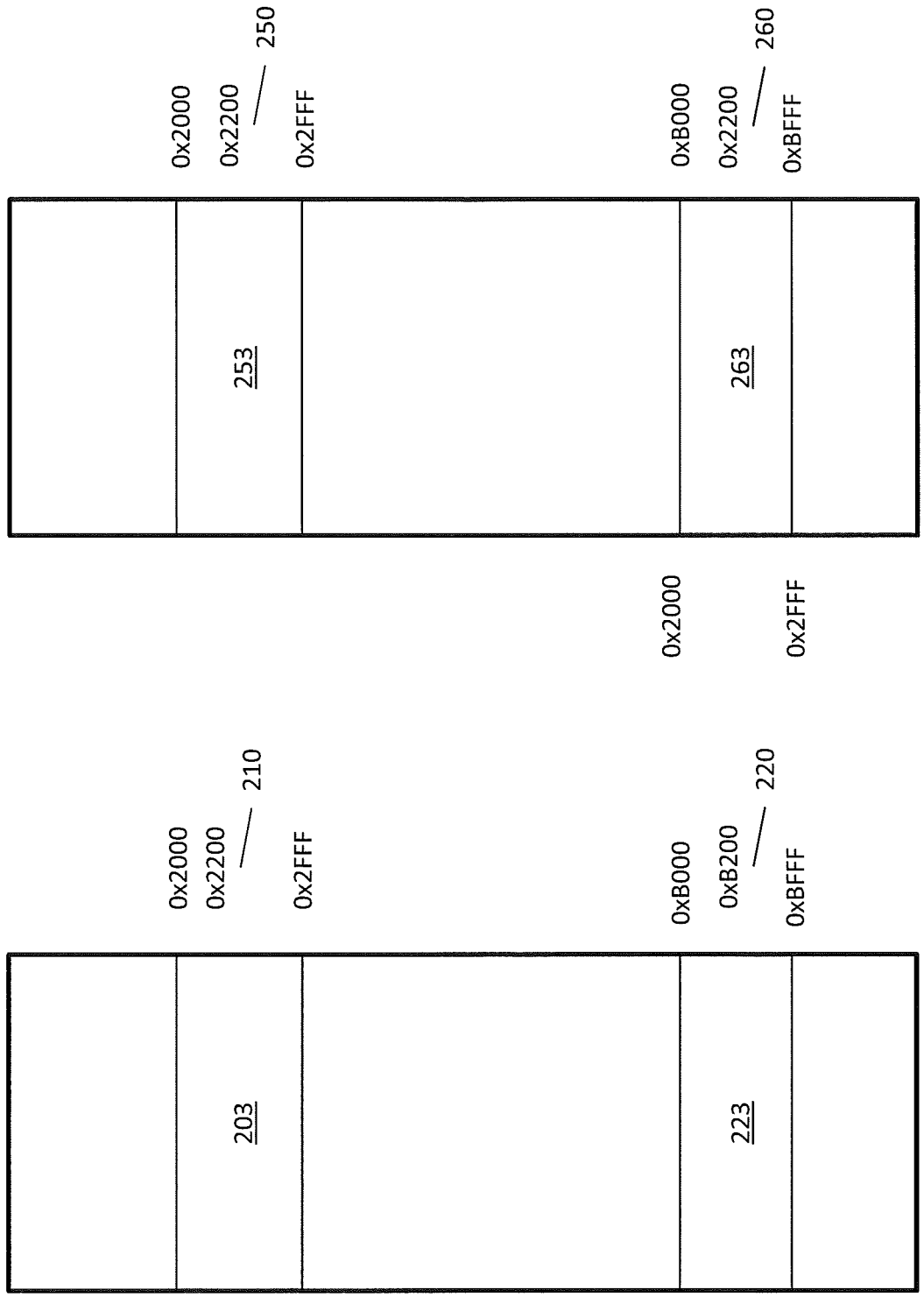
FIG. 2A depicts a block diagram of an exemplary layout of main memory.
FIG. 2B depicts a block diagram of an exemplary layout of main memory.

With reference to FIG. 2A-2B, a block diagram illustrating a memory structure of an embodiment is illustrated. A section of main memory 200 is illustrated in FIG. 2A. A first instance of a program is loaded in block 203, starting at memory location 0x2000. For exemplary purposes, it will be assumed that the first instance occupies memory locations 0x2000 through 0x2FFF. There can be a section of the program that references a specific memory location. As shown in FIG. 2A, reference 210 is to memory location 0x2200. Before the first instance of the program was loaded, reference 210 was to a memory location that is 0x0200 bytes into the program. But since the first instance was loaded at location 0x2000, reference 210 is changed to the actual memory location of 0x2200.

A second instance of the program is loaded in block 223, starting at memory location 0xB000, occupying the memory locations 0xB000 through 0xBFFF. Using a traditional loader, the equivalent to reference 210 is memory location 0xB200 (reference 220). Thus, if one were to compare the program loaded at memory locations from 0x2000 through 0x2FFF to the program loaded at memory locations 0xB000 through 0xBFFF, the programs would not be identical because a reference to location 0x2200 in the first instance is a reference to location 0xB200 in the second instance.

FIG. 2B illustrates embodiments of the present invention effect the memory. As in FIG. 2B, the first instance 253 is loaded at locations 0x2000 through 0x2FFF and the second instance 263 is loaded at actual memory locations 0xB000 through 0xBFFF. However, when second instance 263 is loaded, it is loaded with a parameter of 0x2000. While second instance 263 is loaded at 0xB000 through 0xBFFF, memory locations within second instance 263 are resolved as if it were loaded at locations 0x2000 through 0x2FFF. Reference 260 would be to location 0x2200 in second instance 263 would be identical to reference 250 in first instance 253. In such a manner the first instance 253 and the second instance 263 can be compared with each other while both instances are loaded into main memory. Any references to a specific memory location would be identical in both instances, because the second instance behaves as if it were loaded at 0x2000, unless the first instance was modified after being loaded. Therefore, a direct comparison can be made of the instances of the program loaded in main memory.

There can be several use cases for such an embodiment. As discussed above, one might want to ensure that an already executing program has not been infected with malware. One way to do so is to compare the already executing program to a known clean copy located in secondary memory. Should a loaded copy of a program become corrupted (for example, due to a programming error), it can be possible to maintain another exact copy of the program in another storage location. During certain phases of system processing, including recovery processing, it might not be possible to load a new copy of the program from secondary memory. However, an exact copy can be loaded at another location of main memory at any time. If performed before the corruption occurs, a memory-to-memory copy can be made from the known clean copy.

Embodiments can be executed at any time. In some use case, embodiments can be executed in a periodic manner, to ensure that programs that are currently loaded in main memory are clean and current. The period can be, for example, upon execution of a program, within X number of minutes of executing a program, at random times, daily, and the like. In some embodiments, such a process can be executed on-demand, such that a user can initiate method 100 at any time to determine if a program has been modified.

A variety of remedial actions can be taken if it is determined that a program has changed. In some embodiments, the fact that a program has changed can merely be noted in a log or database. Information about the change also can be stored. The information can include the date and time the change was detected, the amount (number of bytes) that differ, which bytes are different, and the like. At some time in the future, a decision can be made as to the action to take. One might want to determine the reason for the change (e.g., was it malware or is it merely an older version). If it is malware, it can be desirable to determine the cause or source of the malware.

Another option which may be made available to the user is to halt the execution of the program in the event that a modification to the program is detected. The original, baseline, or known clean program (or section of the program) may be restored by removing the modified version detected at the associated memory location and replacing it with the known clean version.

FIG. 3 depicts a high-level block diagram of a computer system 300, which can be used to implement one or more embodiments of the present invention. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
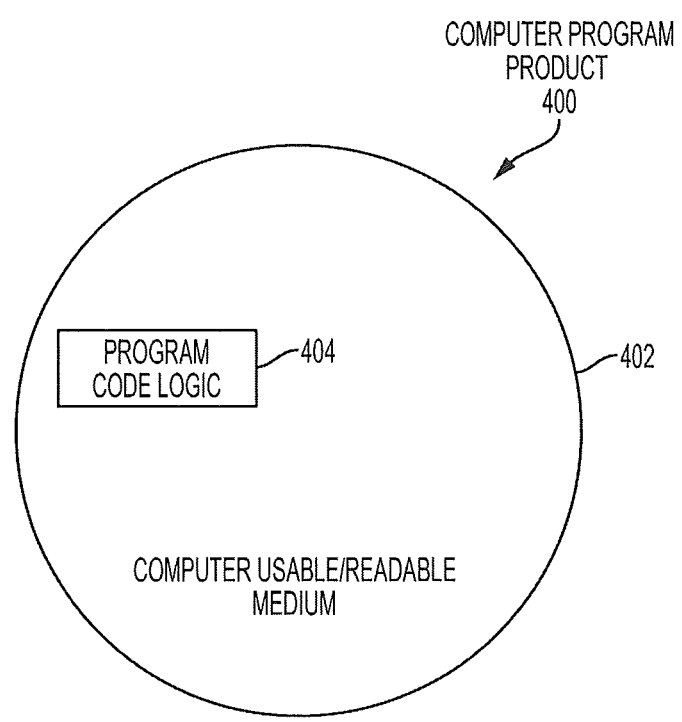
FIG. 4 depicts a computer program product capable of performing one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

The term "computer program" refers to a set of computer instructions which may be executed by a processor to perform one or more functions. A computer program may include an application or an operating system or both the operating system and an application that runs on the operating system.

Turning now to an overview of technologies that are more specifically relevant to aspects of the invention, computer software programs are typically loaded from a secondary memory (such as secondary memory 312) into a main memory (such as main memory 310). Only after the program has been at least partially loaded into main memory is the program executed.

It can be desirable to determine if a program that has been loaded into main memory 310 has been changed from a different instance of the program. For example, there can be a copy of the program already in secondary memory 312 that is known to be current and valid and one wants to know if a version of the program that has been loaded into main memory 310 is the same as or different from the known version. It should be noted that the comparison can also be between two programs that are both loaded in main memory.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application and to enable others of ordinary skill in the art to understand embodiments of the present invention for various embodiments with various modifications as are suited to the particular use contemplated.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system for determining whether a program has been modified, comprising:
 a memory; and
 a processor system configured to:
  determine that a first instance of the program is loaded in main memory;
  determine a starting memory location of the first instance of the program;
  load a second instance of the program into main memory, wherein the second instance of the program is loaded such that memory references in the second instance of the program are resolved as if the second instance were loaded at the starting memory location of the first instance of the program;
  compare the first instance of the program with the second instance of the program; and
  upon determining that the first instance of the program differs from the second instance of the program;
  identify a portion of the first instance of the program that differs from the second instance of the program;
  replace the identified portion of first instance of the program with a corresponding portion of the second instance of the program; and
  store information about detected differences between the first instance of the program differs from the second instance of the program, the stored data including a date and time of the detected differences, a number of bytes that were detected as being different, and an identification of the bytes that were detected as being different.

2. The computer system of claim 1 wherein the second instance of the program is a known clean instance of the program.

3. The computer system of claim 1, wherein the comparing is performed at a periodic interval.

4. The computer system of claim 1, wherein the comparing is initiated by a user.

5. The computer system of claim 1, wherein the processor system is further configured to:
 upon determining that the first instance of the program differs from the second instance of the program, halt execution of the first instance of the program.

6. The computer system of claim 1, wherein:
 the second instance of the program is loaded at a different, non-overlapping memory location from the first instance of the program.

7. A computer program product for determining whether a program has been modified comprising:
 a non-transitory computer-readable storage medium having program instructions embodied therewith, the program instructions readable by a processor system to cause the processor system to:
  determine that a first instance of the program is loaded in main memory;
  determine a starting memory location of the first instance of the program;
  load a second instance of the program into main memory, wherein the second instance of the program is loaded such that memory references in the second instance of the program are resolved as if the second instance were loaded at the starting memory location of the first instance of the program;
  compare the first instance of the program with the second instance of the program; and
  upon determining that the first instance of the program differs from the second instance of the program:
   identify a portion of the first instance of the program differs from the second instance of the program;
   replace the identified portion of first instance of the program with a corresponding portion of the second instance of the program; and
   store information about detected differences between the first instance of the program differs from the second instance of the program, the stored data including a date and time of the detected differences, a number of bytes that were detected as being different, and an identification of the bytes that were detected as being different.

8. The computer program product of claim 7 wherein the second instance of the program is a known clean instance of the program.

9. The computer program product of claim 7, wherein the comparing is performed at a periodic interval.

10. The computer program product of claim 7, wherein the program instructions are further configured to:
 upon determining that the first instance of the program differs from the second instance of the program, halt execution of the first instance of the program.

11. The computer program product of claim 7, wherein:
 the second instance of the program is loaded at a different, non-overlapping memory location from the first instance of the program.

* * * * *